(12) United States Patent
Doig

(10) Patent No.: US 9,221,000 B2
(45) Date of Patent: *Dec. 29, 2015

(54) FILTRATION BARRIER

(71) Applicant: Ian D. Doig, Dora Creek (AU)

(72) Inventor: Ian D. Doig, Dora Creek (AU)

(*) Notice: Subject to any disclaimer, the term of this patent is extended or adjusted under 35 U.S.C. 154(b) by 36 days.

This patent is subject to a terminal disclaimer.

(21) Appl. No.: 14/109,207

(22) Filed: Dec. 17, 2013

(65) Prior Publication Data

US 2014/0102992 A1 Apr. 17, 2014

Related U.S. Application Data

(62) Division of application No. 12/934,787, filed as application No. PCT/AU2009/000401 on Apr. 2, 2009.

(30) Foreign Application Priority Data

Apr. 11, 2008 (AU) .................. 2008901762

(51) Int. Cl.
*B01D 29/50* (2006.01)
*B01D 29/66* (2006.01)
*B01D 29/11* (2006.01)
*B01D 35/10* (2006.01)
*B01D 29/52* (2006.01)
*C02F 1/00* (2006.01)

(52) U.S. Cl.
CPC .............. *B01D 29/66* (2013.01); *B01D 29/114* (2013.01); *B01D 29/52* (2013.01); *B01D 35/10* (2013.01)

(58) Field of Classification Search
None
See application file for complete search history.

(56) References Cited

U.S. PATENT DOCUMENTS

| 4,167,482 | A | | 9/1979 | Muller |
| 4,750,999 | A | | 6/1988 | Roberts et al. |
| 6,103,132 | A | * | 8/2000 | Seyfried et al. ............... 210/791 |
| 6,241,879 | B1 | | 6/2001 | Kato et al. |
| 2003/0080072 | A1 | * | 5/2003 | Morimura ..................... 210/767 |
| 2011/0011790 | A1 | | 1/2011 | Doig |

* cited by examiner

*Primary Examiner* — Allison Fitzsimmons
(74) *Attorney, Agent, or Firm* — Coats & Bennett, PLLC

(57) ABSTRACT

A filtration barrier includes a filter mesh that has a plurality of groups of flexible filter elements, with each group having at least a first and second flexible filter elements disposed in spaced relation. The first flexible filter element is more flexible than the second. Each flexible filter element is secured to the first and second anchoring members of the mesh and free therebetween. During forward fluid flow, the first and second flexible filter elements are supported against downstream deflection and lie in a common plane. For reverse fluid flow, the first flexible element of a group displaces farther from the common plane than the second flexible filter element of that group, such that a first backwash opening associated with the first flexible element is larger than a second backwash opening associated with the second flexible element. Each group may have more elements, and associated methods are also disclosed.

17 Claims, 13 Drawing Sheets

FILTRATION BARRIER

This application is a divisional of U.S. patent application Ser. No. 12/934,787, filed 27 Sep. 2010, which is a National Stage entry of PCT/AU2009/000401, filed 2 Apr. 2009, which claims benefit of Australian Application 2008901762, filed 11 Apr. 2008, the disclosures of all of which are incorporated by reference herein in their entirety.

BACKGROUND

The invention relates to filters wherein the elements forming the filtration apertures enlarge during reversals of the filtrate flow.

Filtration barriers, particularly filter screens and meshes, require a periodic reversal of the fluid flow through the barrier (termed a back-wash) to clear the barrier of captured and entrapped solid particles. The back-washed filtration barrier is then ready for a further filtration. Attention is directed to WO 98/23357 (Obst).

SUMMARY

The invention provides in a first aspect a filtration barrier comprising a plurality of apertures that permit passage of a fluid, but restrict the passage of particles of sizes greater than the aperture width. The apertures are first spaces between neighboring bristles or elements. A plurality of bristles or elements are securely attached to a single support bar to form a comb. Each bristle or element has a free end with its other end attached to the single support bar with all bristles or elements arranged parallel to each other. The plurality of said combs are arranged with second spaces between each pair of adjacent single support bars in a parallel array so that the free ends of the bristles or elements of each comb of the plurality of combs overlap the support bar of the next comb in the array. The bristles or elements of each comb branch from the support bar and lie in a common plane in their relaxed state. Each support bar is supported upon a plurality of support joists arranged transversely to the support bars. Each bristle or element is supported at its free end by the next comb, and each bristle or element is of a stiffness and length that permits each bristle or element to yield only slightly under pressure from fluid flowing forwardly between the bristles or elements towards the support joists. When fluid flows backwardly through the barrier each bristle or element is unsupported at its free end, whereby the bristles or elements yield under pressure from the backwardly flowing fluid and the free ends of bristles or elements are raised above the next comb, or combs, thereby enlarging the flow area through the filter barrier, and imparting a tangential direction to the fluid leaving each comb. The cross-section of the bristles or elements may be round, or elliptical, or rectangular, or wedge-shaped.

The invention provides in a second aspect a filtration barrier as described in the first aspect comprising a first plurality of pairs of bristles or elements wherein each pair of the first plurality comprises a second bristle or element that is less stiff than a first bristle or element. Each second bristle or element is lifted above each first bristle or element when fluid flows backwardly between bristles or elements.

The invention provides in a third aspect a filtration barrier as described in the first aspect comprising a second plurality of triplets of bristles or elements. Each triplet of the second plurality comprises a third bristle or element that is less stiff than a second bristle or element, and a second bristle or element that is less stiff than the first bristle or element. Each third bristle or element is raised further than each second bristle or element and each second bristle or element is raised further than each first bristle or element when the fluid flows backwardly between the bristles or elements.

The invention provides in a fourth aspect a filtration barrier as described in any prior aspect wherein variations of cross-section between individual bristles or elements determines stiffness.

The invention provides in a fifth aspect a filtration barrier as described in any of the prior aspects wherein the free end of each bristle or element extends in length beyond more than two said second spaces, and wherein fluid flowing forwardly between adjacent single support bars or strips passes sequentially through the first spaces of more than one comb.

The invention provides in a sixth aspect a filtration barrier as described in any of the prior aspects wherein each comb in the plurality of said combs is numbered 1, 2, 3, 4, etc., in a third sequence of combs to denote the position of each comb in the plurality, and wherein each odd-numbered comb is a first comb and each even-numbered comb is a second comb, and all the bristles or elements in each first comb branch from their single support bar or strip towards the right hand side, and all the bristles or elements in each second comb branch from theft single support bar or strip towards the left hand side.

The invention provides in a seventh aspect a filtration barrier as described in any of the first, second, third, fourth, or fifth aspects wherein support joists are arranged in a parallel and equally-spaced apart array. The combs are assembled and fastened at an angle between 45 and 135 degrees to the support joists in a fourth sequence of combs. The bristles or elements of the next comb in the fourth sequence overlap the bristles or elements of one or more prior combs. In the fourth sequence to form the filter barrier.

The invention provides in an eighth aspect a filtration barrier as described in the sixth aspect wherein the support joists are arranged in a parallel and equally-spaced apart array, and whereon the combs are assembled and fastened at an angle between 45 and 135 degrees to the support joists in a fifth sequence of combs, wherein the bristles or elements of the next comb in the fifth sequence overlap the bristles or elements and the support bar or strip of one or more prior combs in the fifth sequence to form the filter barrier.

The invention provides in a ninth aspect a filtration barrier whose components are defined in any of the first, second, third, fourth, or fifth aspects, wherein said bristles or elements are primary elements within a first sheet of resilient material, and the single bars or strips are second elements within the first sheet. The primary elements are arranged transversely to the second elements. The second elements are in the same plane as the primary elements in their relaxed state. The primary elements are each anchored to the second elements at one end only leaving a non-attached end free to be lifted out of said plane. The support joists are narrow third elements that are attached to the underside of the flat first sheet and are arranged at a common angle between 0 and 45 degrees to the second elements. The third elements are positioned to prevent each said non-attached end moving past the third elements. The primary elements are grouped into pairs of primary elements in a sequence of pairs wherein the second primary element of each pair less stiff than the first primary element. Each second primary element rises above each first primary element when fluid flows backwardly between the primary elements.

The invention provides in a tenth aspect a filtration barrier whose components are those of the ninth aspect wherein the primary elements are attached at each end to adjacent second elements, and wherein each primary element is of a flat and narrow zig-zag, or curved, or sinusoidal shape that increases its extensibility. The support joists are narrow fifth elements that are attached to the underside of the flat first sheet and are arranged at a common angle between 45 and 135 degrees to the primary elements, and wherein the fifth elements are positioned below one or more places along the length of each primary element to prevent each primary element moving past the fifth elements.

The invention provides in an eleventh aspect a filtration barrier whose components are those of either the ninth or tenth aspects wherein the primary elements are grouped into triplets of primary elements in a sixth sequence of triplets wherein the third primary element of each triplet is less stiff than the second primary element of each triplet, and the second primary element of each triplet within each sixth sequence is less stiff than the first primary element of each triplet. Each third primary element is raised further than each second primary element, and each second primary element is raised further than each first primary element, when fluid flows backwardly between primary elements.

The invention provides in a twelfth aspect a filtration barrier as described in the eleventh aspect wherein the support joists are arranged in a parallel and equally-spaced apart array. The combs are assembled and fastened with the support bars or strips positioned at an angle between 0 and 45 degrees to the support joists in a fifth sequence of combs. The bristles or elements of the next comb in the fifth sequence overlap the bristles or elements and the support bar or strip of one or more prior combs in the fifth sequence to form the filter barrier.

The invention provides in a thirteenth aspect a filtration barrier wherein the bristles or elements of the first aspect become primary elements within a first sheet of resilient material, and the single bars or strips of the first aspect become second elements within the first sheet. The primary elements are arranged transversely to the second elements, and the second elements share a common plane with the primary elements in their relaxed state. The primary elements are each attached to a second element at one end only leaving a non-attached end free to be lifted out of the common plane. The support joists are narrow third elements attached to the underside of the flat first sheet and are arranged at a common angle between 0 and 45 degrees to the second elements. The third elements are positioned to prevent each said non-attached end moving past the third elements. The primary elements form pairs of primary elements in a sequence wherein the second primary element of each pair in the sequence is less stiff than the first primary element. Each second primary element is raised above each first primary element when the fluid flows backwardly between the primary elements.

The invention provides in a fourteenth aspect a filtration barrier as described in the thirteenth aspect wherein the primary elements are attached at each end to adjacent second elements, and each primary element is of a flat and narrow zig-zag, or curved, or sinusoidal shape that increases its extensibility. The support joists are narrow fifth elements adjacent the underside of the flat first sheet and are arranged at a common angle between 45 and 135 degrees to the primary elements. The fifth elements are positioned at one or more places along the length of each primary element to prevent each primary element moving past the fifth elements.

The invention provides in a fifteenth aspect a filtration barrier as described in the thirteenth or fourteenth aspect wherein the primary elements form triplets of primary elements in a sixth sequence of triplets. The third primary element of each triplet is less stiff than the second primary element of each triplet, and the second primary element of each triplet is less stiff than the first primary element of each triplet. Each third primary element is raised further than each second primary element and each second primary element is raised further than each first primary element when the fluid flows backwardly between primary elements.

The invention provides in a sixteenth aspect a filtration barrier as described in the fifteenth aspect wherein a single first comb of the sixth aspect and a single second comb of the sixth aspect are overlapped and assembled as a paired ribbon. The single first comb and the single second comb are appropriately spaced. The paired ribbon is wrapped around a tubular grid as a helix wherein each successive wrap of the paired ribbon appropriately overlaps a prior wrap to obtain the required spacing of first and second combs, whereby a tubular filter element is formed.

The invention provides in a seventeenth aspect a filtration barrier wherein the elements of the first aspect become warp elements within a filter mesh or screen. The single bars or strips of the first aspect become weft elements within the filter mesh or screen, wherein the warp elements are arranged transversely to the weft elements, and wherein the spaces between the warp elements are the filtration apertures. The weft elements and the warp elements lie in approximately the same plane in their relaxed state. The warp elements are each secured to weft elements at each end. The spaces between the weft elements are at least four times the spaces between the warp elements. The support joists of the first aspect are stiff rod or wire elements that are adjacent to the underside of the filter mesh or screen and are arranged at a common angle between 0 and 45 degrees to the weft elements. The stiff rod or wire elements are spaced and positioned at intervals shorter than the spaces between the weft elements. The stiff rod or wire elements are spaced and positioned to limit the deflection of warp elements when fluid flows forwardly past warp elements before passing between the stiff rod or wire elements. The warp elements are raised away from the stiff rod or wire elements when fluid flows backwardly between the warp elements. The warp elements are grouped into pairs of warp elements in a sequence of the pairs wherein the first warp element of each pair in the sequence is more extensible than the second warp element. Each first warp element is raised above each second warp element when fluid flows backwardly between the warp elements.

The invention provides in an eighteenth aspect a filtration barrier as described in the seventeenth aspect wherein the warp elements are grouped into individual groups of warp elements in a sequence of individual groups. The first warp element of each individual group is more extensible than the second warp element, the second warp element of each individual group is more extensible than the next warp element, and thereafter each next warp element of each individual group is more extensible than the sequentially next warp element, until the last warp element of each group is the least extensible warp element of each individual group. When fluid flows backwardly between the warp elements each first warp element is raised above each second warp element of each individual group, and each second warp element is raised above each next warp element of each individual group, and thereafter each next warp element of each individual group is raised above its sequentially next warp element, until the last warp element of each individual group is the least raised warp element of each group.

The invention provides in a nineteenth aspect a filtration barrier as described in the eighteenth aspect or nineteenth aspect wherein individual warp elements comprise one or more filaments twisted together to form a rope or thread.

Extensibility of individual warp elements decreases with an increase in the number of filaments in the individual warp element.

The invention provides in a twentieth aspect a filtration barrier as described in the seventeenth aspect or eighteenth aspect wherein individual warp elements comprise a single fiber or filament. Extensibility of individual warp elements decreases as the cross section size of the individual filament increases.

The invention provides in a twenty-first aspect a filtration barrier as described in the seventeenth aspect or the eighteenth aspect wherein each warp element is of a zig-zag shape, or sinusoidal shape, or curved shape.

In one or more embodiments, a filtration barrier of the present invention comprises a filter mesh. The filter mesh has a plurality of groups of flexible filter elements, with each group comprising at least a first flexible filter element and a second flexible filter element disposed in spaced relation to the first flexible filter element. Within each group, the first flexible filter element is more flexible than the second flexible filter element. The filter mesh further includes first and second anchoring members spaced from each other. Each flexible filter element is secured to the first and second anchoring members and free therebetween. A plurality of support members are disposed downstream of the filter mesh for forward fluid flow through the filter mesh. The first and second flexible filter elements are configured such that the first and second flexible filter elements rest against one or more of the support members during forward fluid flow through the filter mesh such that the first and second flexible filter elements are supported against downstream deflection and lie in a common plane. The common plane being transverse to a direction of forward fluid flow through the filter mesh. For each group, the first and second flexible filter elements are configured such that, in response to reverse fluid flow, opposite the direction of forward fluid flow, the first flexible element of that group displaces farther from the common plane than the second flexible filter element of that group displaces from the common plane, such that a first backwash opening associated with the first flexible element is larger than a second backwash opening associated with the second flexible element.

In one or more embodiments, a method of filtering includes providing a filtration barrier, forwardly passing fluid through a filter mesh of the filtration barrier, and thereafter reversing fluid flow so that fluid flows through the filter mesh in a backwash direction. The filtration barrier includes a filter mesh and a plurality of support members. The filter mesh comprises a plurality of groups of flexible filter elements. Each group includes at least a first flexible filter element and a second flexible filter element disposed in spaced relation to the first flexible filter element. Within each group, the first flexible filter element is more flexible than the second flexible filter element. The filter mesh further includes first and second anchoring members spaced from each other. Each flexible filter element is secured to the first and second anchoring members and free therebetween. The plurality of support members are disposed downstream of the filter mesh for forward fluid flow through the filter mesh. During the forward fluid flow, for each group, the first and second flexible filter elements rest against one or more of the support members such that the first and second flexible filter elements are supported against downstream deflection and lie in a common plane, the common plane being transverse to a direction of the forward fluid flow through the filter mesh. During the reverse fluid flow, for each group, the first flexible element of that group displaces farther from the common plane than the second flexible filter element of that group displaces from the common plane, such that a first backwash opening associated with the first flexible element is larger than a second backwash opening associated with the second flexible element.

The aspects described above can be employed to provide a continuously filtering filter wherein a filtration barrier and a set of nozzles are moved relatively to each other, and wherein flowing jets of washing fluid are directed backwardly onto the support joists side of the filtration barrier to progressively flush a part, or parts of the filter barrier, simultaneously fluid to be filtered is being driven forwardly through the remaining parts of the filtration barrier by a higher fluid pressure on the bristles or elements side of the filter barrier, thereby providing washing fluid jets that locally and progressively lift the bristles or elements of a small part of the filtration barrier, thereby flushing ensnared particles from between or upon those bristles or elements, while filtration continues elsewhere, and wherein the discharge direction of washing fluid exiting the bristles or elements is preferably downwards.

DETAILED DESCRIPTION

Preferred embodiments of the invention will now be described, by way of examples only, with reference to the accompanying drawings.

Figure 1:
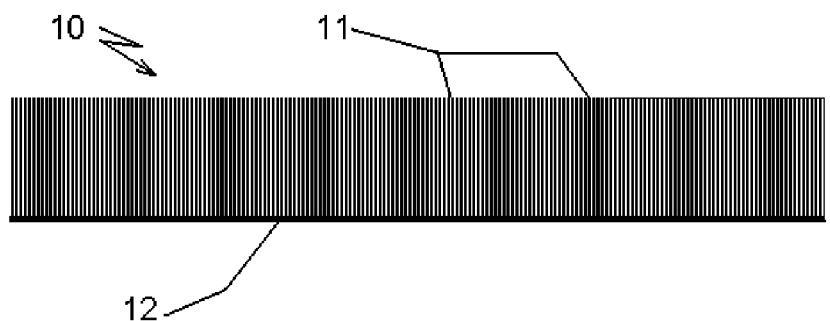
FIG. 1 shows a section of a filter comb.

FIG. 1 shows a section of a filter comb 10 wherein a plurality of bristles or elements 11 are arranged parallel to each other and in a common plane, and wherein each bristle or element branches from a single strip or bar or backbone 12.

Figure 2:
FIG. 2 shows the filter comb of FIG. 1 with an additional stiffening strip supporting the bristles.

FIG. 2 shows the filter comb of FIG. 1 with an additional stiffening strip 15 to assist holding the bristles or elements 11 in their parallel arrangement.

Figure 3:
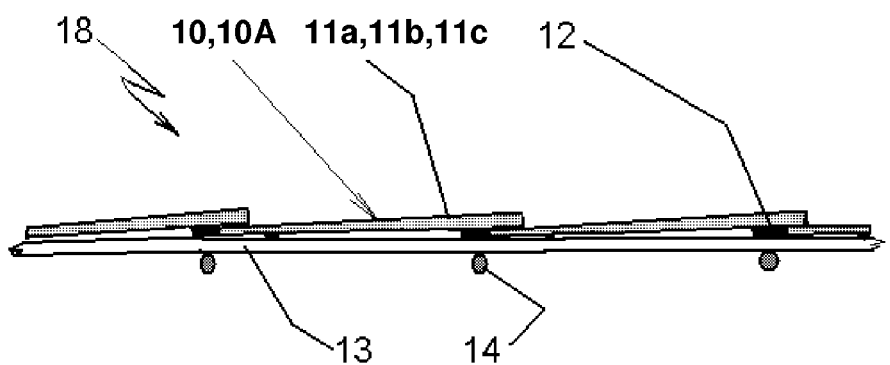
FIG. 3 shows a side view in cross section of part of a filtration barrier comprising filter combs of FIG. 1 or FIG. 4A in the filtering position.
Figure 4:
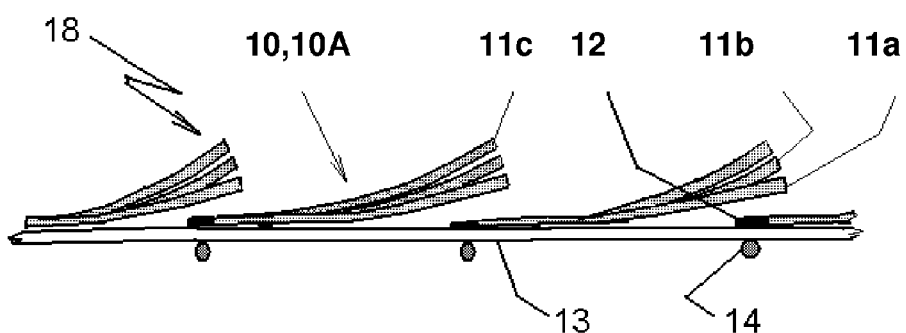
FIG. 4 shows a side view in cross section part of the filtration barrier of FIG. 3 with the bristles in the back-washing position.
Figure 4A:
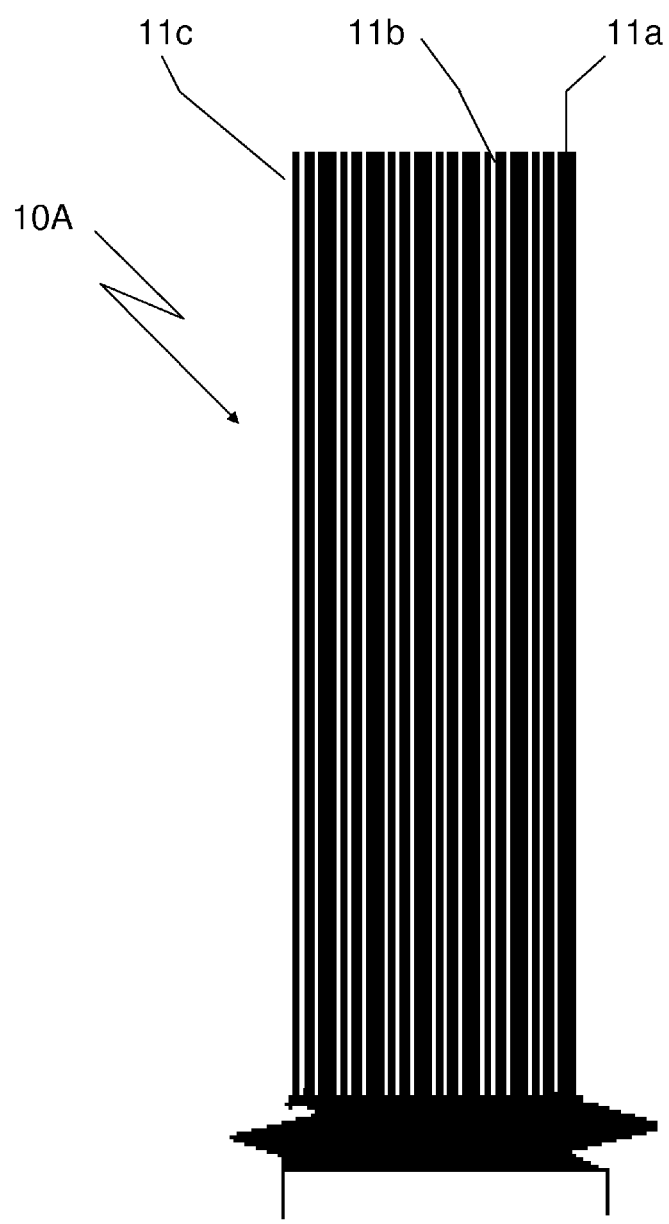
FIG. 4A shows a part of the filter comb of FIG. 1 with the bristles arranged as a sequence of triplets where each triplet comprises three bristles of decreasing width.

FIG. 3 is a side view in cross section of several filter combs 10, 10A of FIG. 1 or 4A assembled into an array 18 wherein the single strip or bar of each filter comb is anchored onto transverse joists 13 with the free end of each bristle or element 11a, 11b, and 11c of each triplet of elements is supported upon the bristles and the single strips 12 of the next filter comb 10. The joists 13 are supported by transverse bearers 14. The bristles 11a, 11b, and 11c are shown in their position when the filtration barrier 10 or 10A is filtering and fluid flows downwards.

FIG. 4 is a side view in cross section the filter comb array 18 of FIG. 3 with bristles or elements 11a, 11b, 11c of each triplet of bristles or elements shown in their open position when the filtration barrier 10 is being back washed by an upwards flow of fluid through filtration barrier 10 and the free ends of bristles or elements are raised away from the bristles of the next filter comb by the (back-wash) flow of fluid from below.

FIG. 4 illustrates either the bristles 11 of FIG. 1 (shown by bristles 11a only), or the bristles 11a, 11b and 11c of FIG. 4A arranged in triplets. Note that the most flexible bristle 11c in each triplet deflects furthest, the lesser flexible bristle 11b in each triplet deflects less far, and the least flexible bristle in each triplet 11a deflects least.

Figure 5:
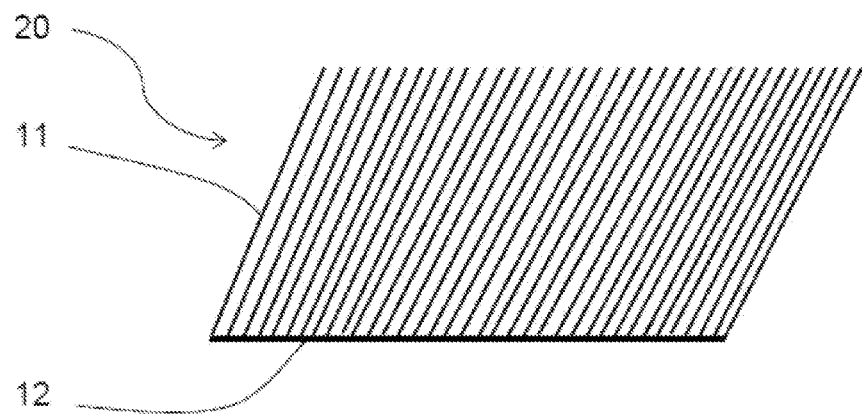
FIG. 5 shows the filter comb of FIG. 1 with the bristles inclined to the right.

FIG. 4A shows part of a single filter comb 10A, similar to that of FIG. 1, with sequenced triplets of bristles 11a, 11b, 11c, with each bristle lengthened and branching from a single strip or backbone 12, wherein the bristle 11c in each triplet is narrower than the adjacent bristle 11b, and the bristle 11b in each triplet is narrower than the adjacent bristle 11a. FIG. 5 shows a filter comb 20, similar to that of FIG. 1 with its bristles 11 inclined to the right, and branching from a single strip or bar or backbone 12.

Figure 6:
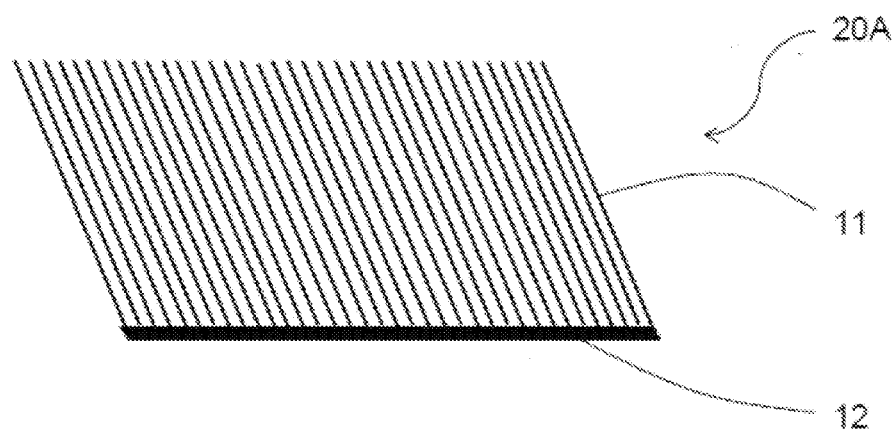
FIG. 6 shows the filter comb of FIG. 1 with the bristles inclined to the left.

FIG. 6 shows a filter comb 20A1 similar to that of FIG. 1 with its bristles 11 inclined to the left, and branching from a single strip or bar or backbone 12.

Figure 7:
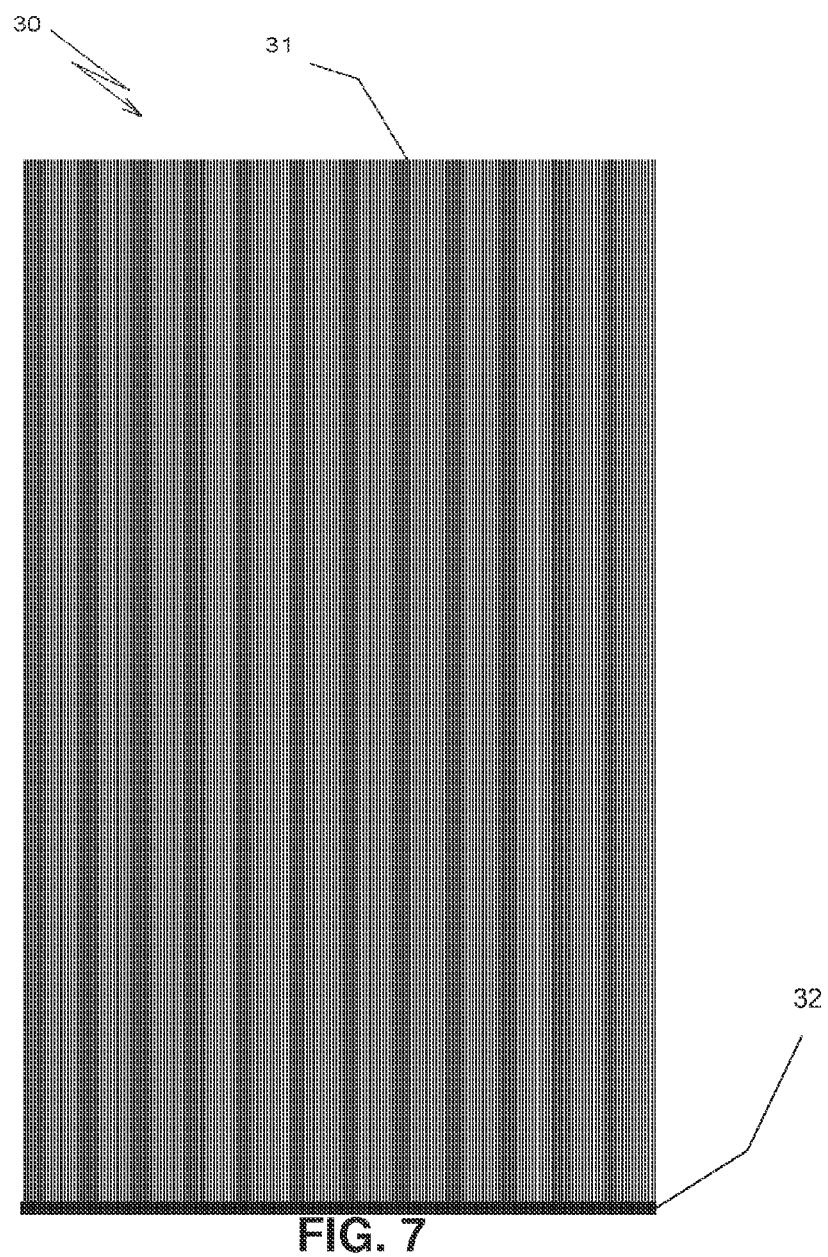
FIG. 7 shows the filter comb of FIG. 1 with lengthened bristles.

FIG. 7 shows a single filter comb 30, similar to that of FIG. 1 with bristles 31 considerably lengthened and branching from a single strip or backbone 32.

Figure 8:
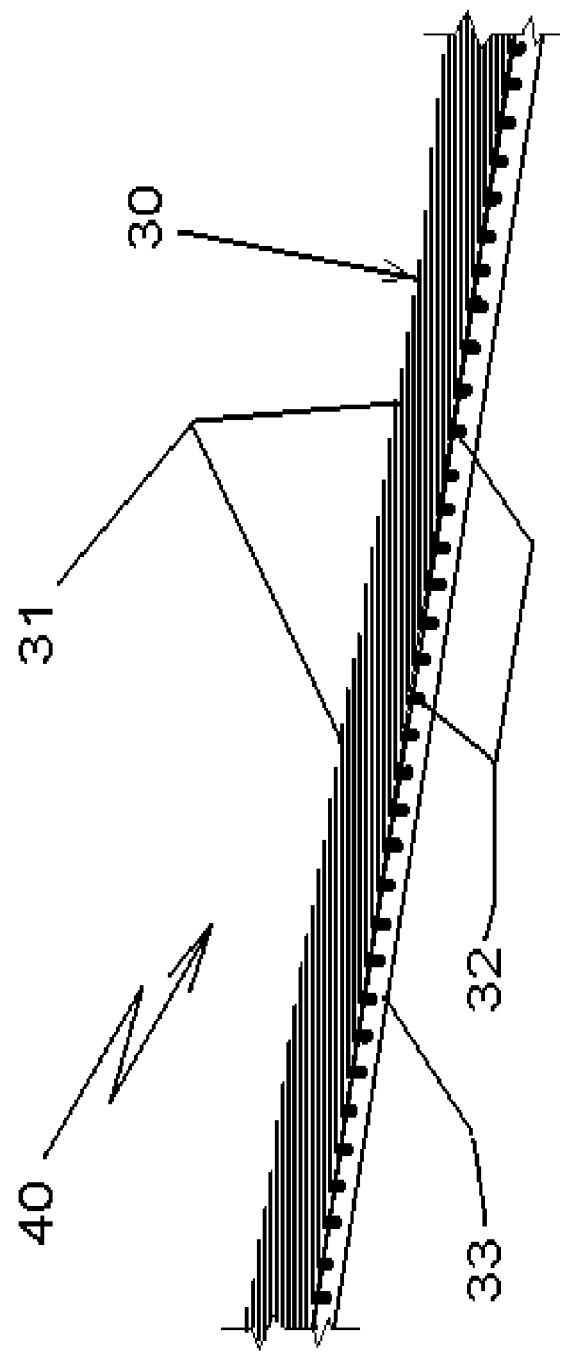
FIG. 8 shows a side view in cross section of a section of a filtration barrier comprising several overlaying filter combs of FIG. 7 in the filtering position.

FIG. 8 is a side view in cross section of several filter combs 30 of FIG. 7 assembled into a filter barrier 40 wherein the bristles of each filter comb is anchored onto joists 33 with the free end of each bristle supported upon the bristles of underlying filter combs. The joists 13 are themselves supported by bearers (not shown) like the bearers 14 of FIG. 3. The bristles or elements are shown in their position when the filtration barrier 40 is filtering: in this example, fluid passes through nine layers of bristles: Items common to FIG. 7 are shown by like numbers.

Figure 9:
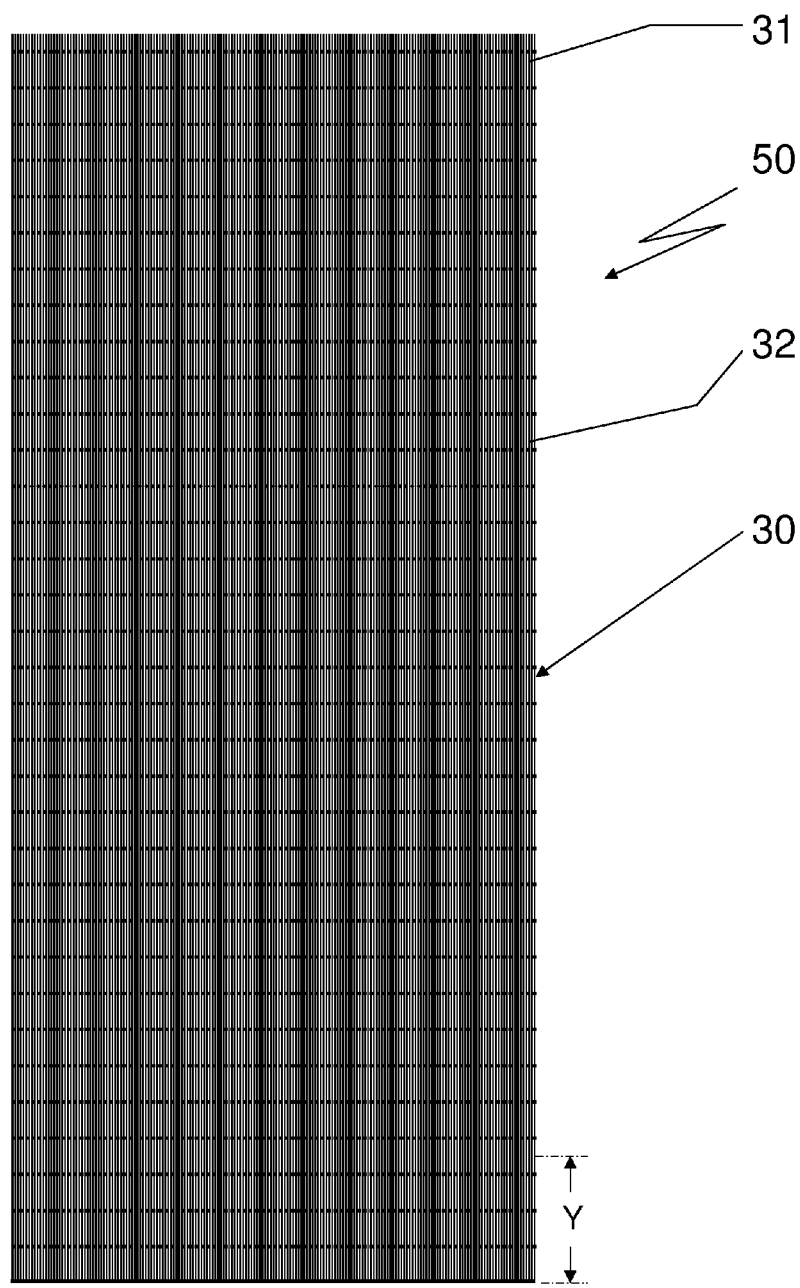
FIG. 9 shows a plan view of a section of part of a filtration barrier comprising several filter combs of FIG. 1 or FIG. 4A or FIG. 7 in the filtering position.

FIG. 9 shows a plan view of a part of a filtration barrier 50 comprising a plurality of the 30 filter combs of FIG. 7 or FIG. 4A. It is a view as would be seen from above the array of FIG. 8. The dimension Y shows the length of the bristles in one comb. Items common to FIG. 7 are shown by like numbers.

Figure 10:
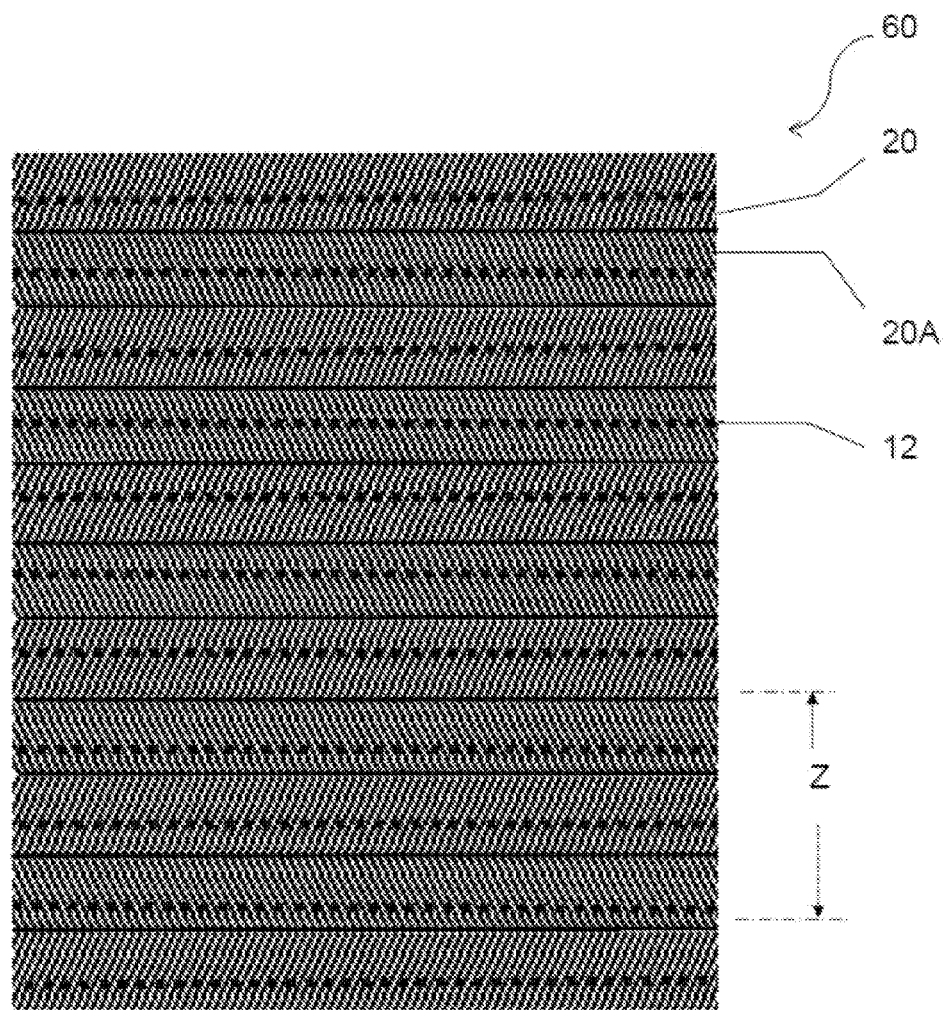
FIG. 10 shows a plan view of a section of part of the filtration barrier comprising several filter combs of FIGS. 5 and 6 laid in alternate layers wherein the filter combs have lengthened bristles.

FIG. 10 shows a plan view of a part of the filtration barrier 60 comprising several filter combs of FIGS. 5 and 6 laid in overlapping alternate layers wherein the filter combs have lengthened bristles. The dimension Z shows the length of the bristles in one comb. Items common to FIGS. 5 and 6 are shown by like numbers.

Figure 11:
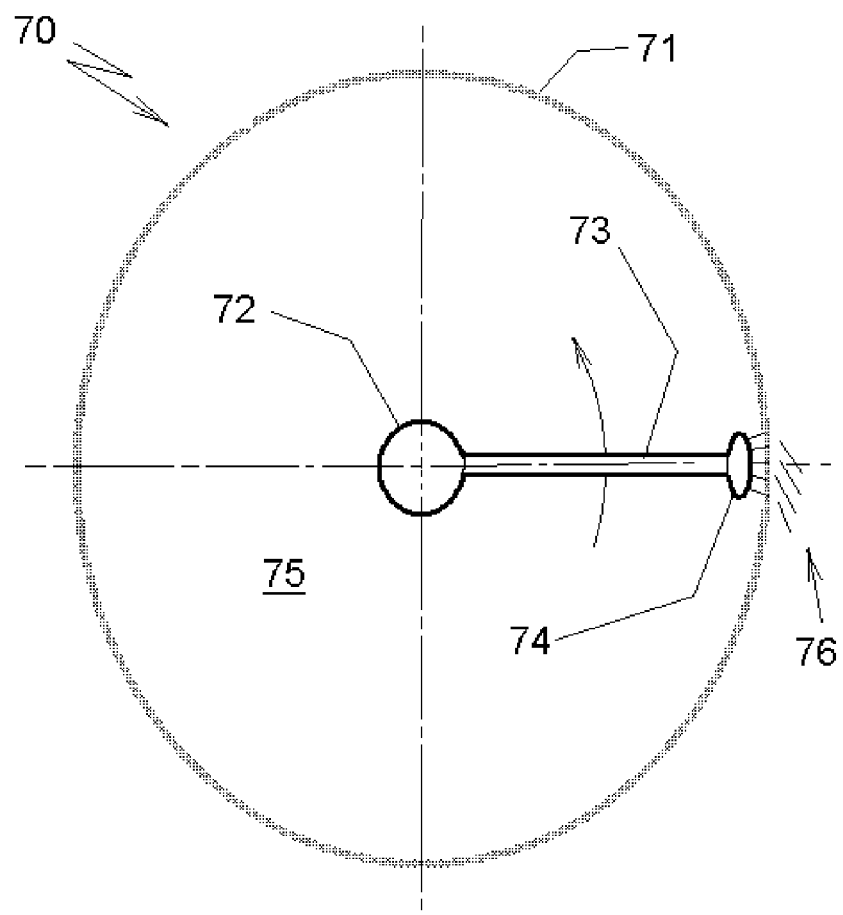
FIG. 11 is a schematic end view in cross section of a continuously filtering filter where the filtration barrier is of tubular form.

FIG. 11 is a schematic end view in cross section of a continuously filtering filter 70 wherein the filtration barrier is of tubular form. It shows a filtration barrier 71 wherein a rotating set of filter cleaning nozzles 74 deliver streams of back-washing fluid onto the inside of the filtration barrier 71, and the rotating set of filter cleaning nozzles are carried on a hollow arm 73, which is attached to a central driven hollow shaft 72, which moves the cleaning nozzles progressively and continuously around inside the filtration barrier to locally lift and flush the bristles of the filtration barrier while filtration continues in all other parts of the filter barrier. Filtration is continued by the filter 70 being immersed in a fluid containing particles to be filtered with the pressure within the inside space 75 being at a lesser pressure than that outside of the filter barrier 70. The preferred orientation is with the axis vertical, allowing particles 76 flushed from the filtration barrier to fall away from the filter and collect at its base.

Figure 12:
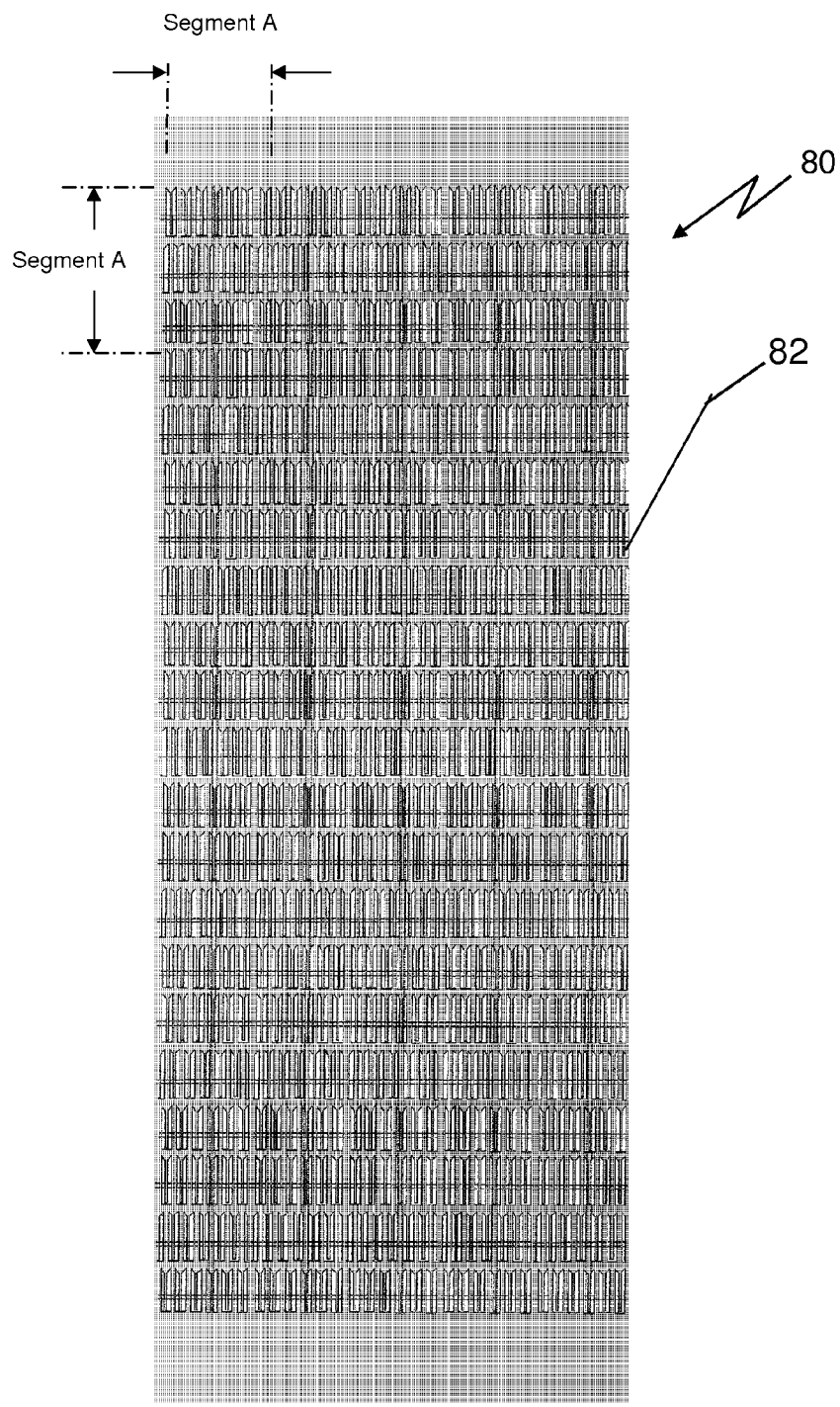
FIG. 12 shows a plan view or part of the filtration barrier comprising a screen with U-shaped slots with underlying support bars.

FIG. 12 shows a section of a filtration barrier 80 that comprises a screen 82.

Figure 13:
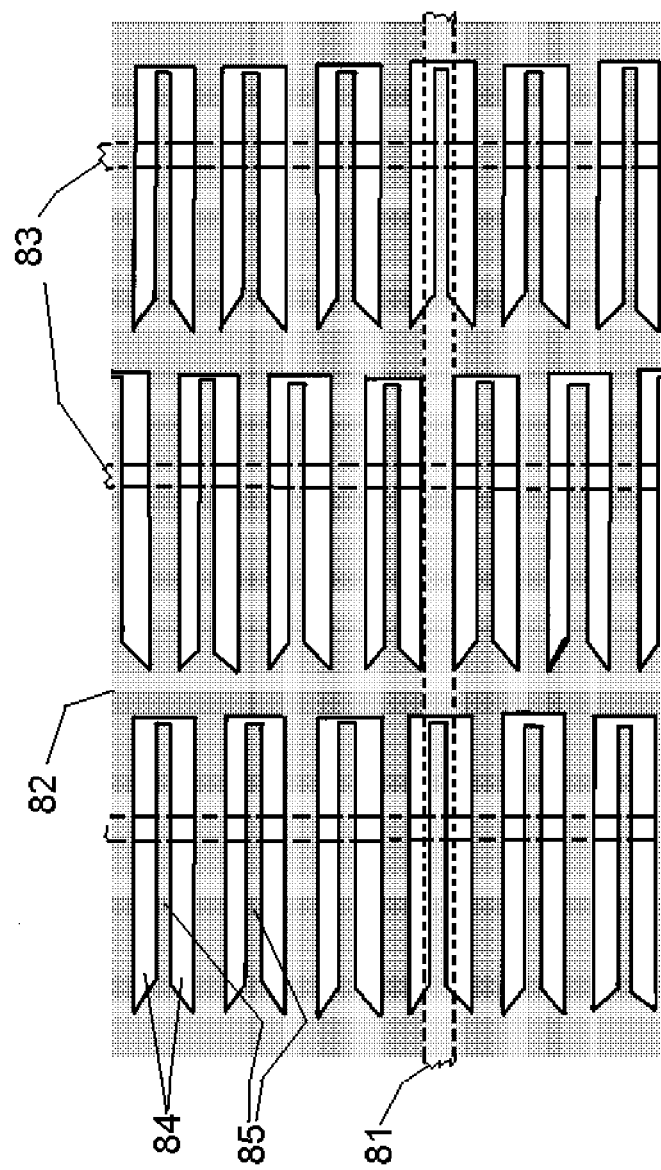
FIG. 13 shows an enlarged view of a section of the filtration barrier of FIG. 12.

FIG. 13 shows an enlargement of the designated "Section A" of the filtration barrier 80 shown in FIG. 12 wherein un-perforated regions of the screen 82 are shown shaded and the support joists 83 and support bearers 81 (supporting the joists 83) are shown as dotted lines to indicate that they lie under the screen 82. The screen 82 is a perforated thin sheet (of metal or an appropriate plastic) with resilient properties perforated with a plurality of U-shaped slots 84. In this example each of the U-shaped perforations 84 have a cantilevered central strip 85 that is attached to (or continuous with) the thin sheet at one end: it is thereby free to deflect resiliently as a cantilever away from the plane of the thin sheet thereby increasing the flow area for fluid flowing through the slot. When fluid flows forwardly (through the screen before flowing through the support bars 81 and 83) the central strip 85 is supported by the support bars 83 and deflection of the central strip 85 is thereby restricted when fluid flows forwardly through the apertures towards the support bars 83. When fluid flows backwardly through the screen 80 each strip 85 is unsupported, and each strip can yield resiliently increasing the flow area through the U-slots to more easily release particles that have been entrapped within the U-slots. The resilience of each strip 85 causes it to return to the supported position shown in FIG. 13 whenever the flow through the screen flows forwardly again.

Although the slots 84 in this example are shown as generally rectangular in shape, they are not limited to this shape. Slots that are part-round, or part-square, or part elliptical, or curved, with strips 85 that are zig-zag shaped with square or rounded corners can be readily devised, and the outer contour of the slots 84 surrounding each strip 85 can be shaped to provide a variety of different slot or hole shapes.

Figure 14:
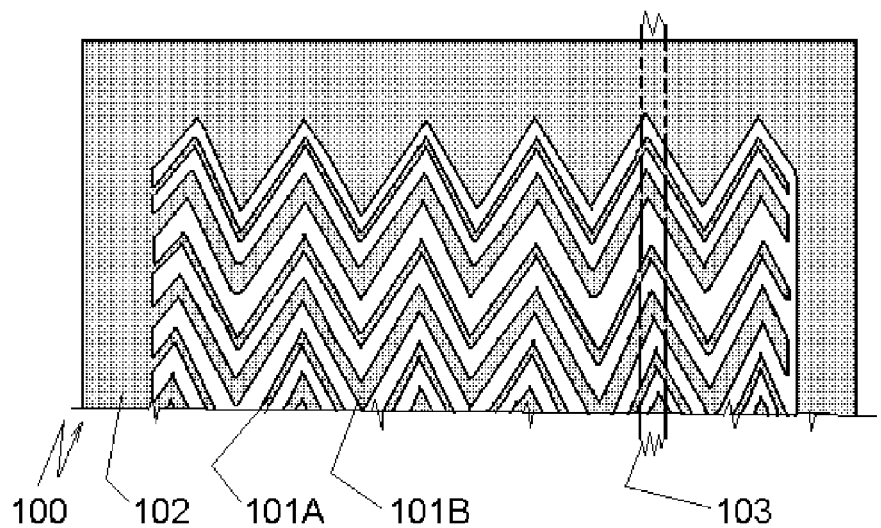
FIG. 14 shows a plan view of part of a filtration barrier comprising a screen and support bars wherein zig-zagged flat elements of two alternate widths are shown, and the elements are attached at one end only.

FIG. 14 shows a section of a filtration barrier 100 that comprises a screen 102 wherein there are several strips 101A and 101B that are zig-zag in shape (to confer greater extensibility) with slots between each strip 101A and 101B, wherein the strips 101A are narrower (and thereby more flexible) than the strips 101B. The strips 101A and 101B are attached to the sheet 102 at one end only. The support bars 103 support the free ends of strips 101A and 101B against deflection when fluid flows forwardly through the apertures towards the support bars 103. When deflection due to fluid flowing backwardly through the slots occurs the narrower strips 101A deflect more than strips 101B to provide increased flow areas through the slots.

Figure 15:
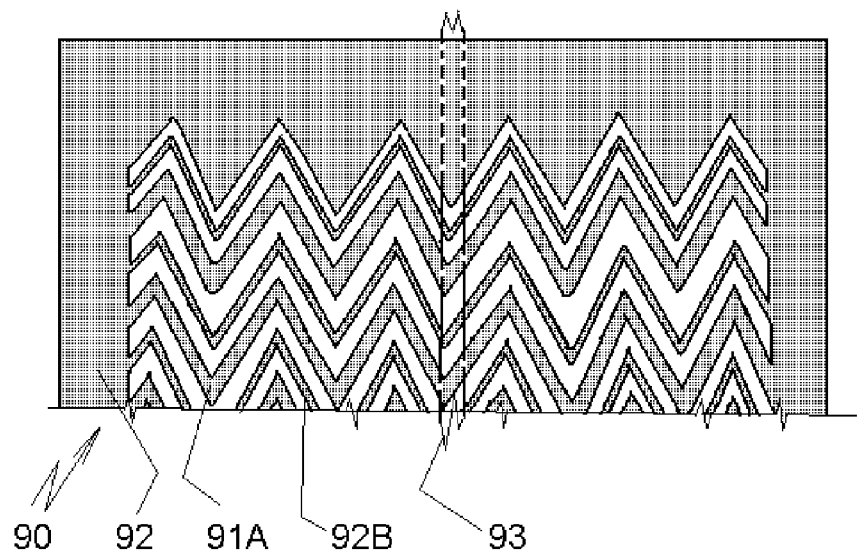
FIG. 15 shows a plan view of part of the filtration barrier comprising a screen and support bars wherein zig-zagged flat elements of two alternate widths are shown, and the elements are attached at both ends.

FIG. 15 shows a section of a filtration barrier 90 that is similar to that of FIG. 14 wherein the strips 91A and 91B are attached to sheet 92 at both ends. The support bars 93 support the central region(s) of strips 91A and 91B against deflection when fluid flows forwardly through the slots towards the support bars 93. When deflection due to fluid flowing backwardly through the slots occurs the narrower strips 91B deflect more than strips 91A to provide increased flow areas through the slots.

Figure 16:
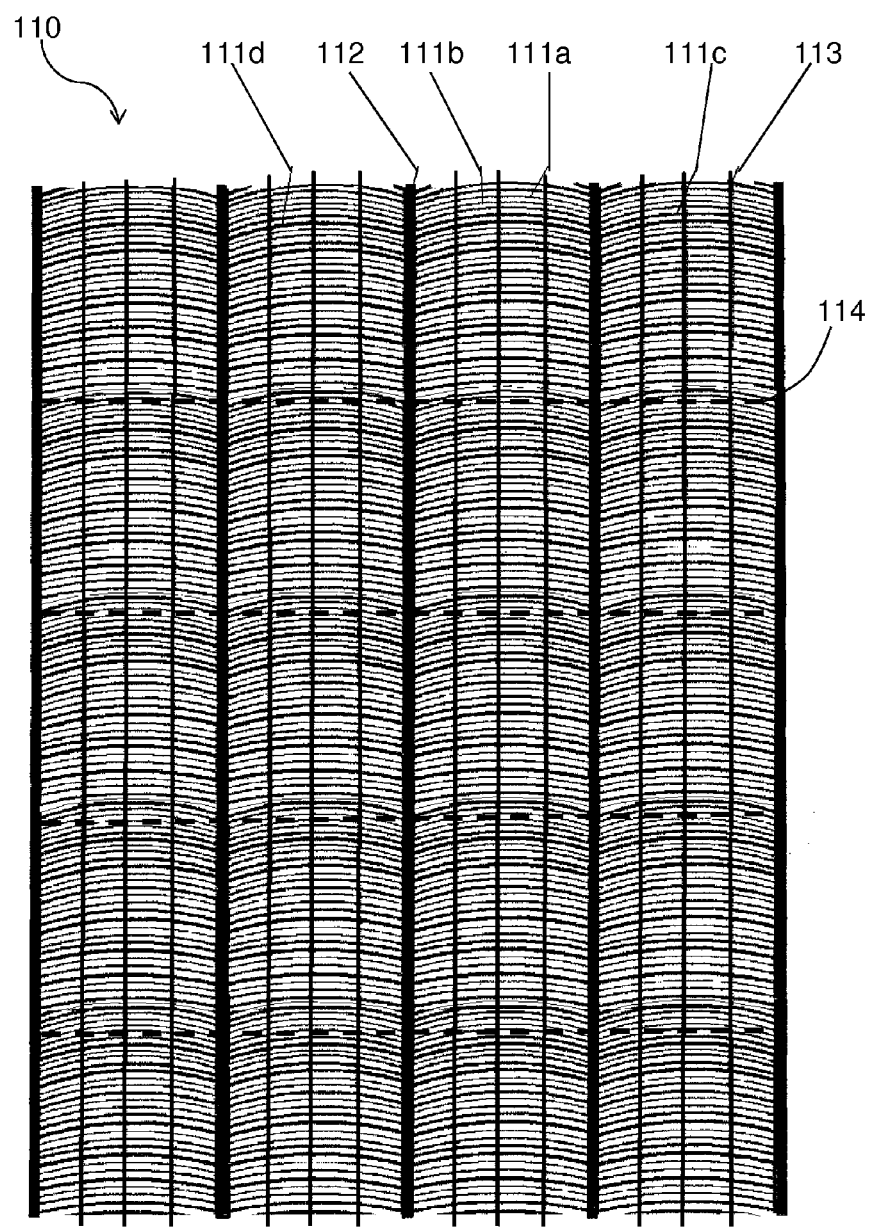
FIG. 16 shows a plan view of part of filter screen or mesh with curved and grouped warp elements arranged into groups wherein the warp elements increase in thickness and stiffness within each group.

FIG. 16 shows a plan view of part of a filter screen or mesh 110 with curved and grouped warp elements 111a,111b,111c and 111d, which are arranged into groups, with each group comprising four warp elements, and where within each group warp elements 111a are thinner (and thereby more flexible) than warp elements 111b, and warp elements 111b are thinner (and thereby more flexible) than warp elements 111c, and warp elements 111c are thinner (and thereby more flexible) than warp elements 111d. Weft elements 112 secure the ends of all the warp elements at intervals, and support joists 113 underlay the warp elements at intervals between adjacent weft elements and support the warp elements when fluid being filtered flows downwards (or forwardly) past warp elements before flowing past the support joists 113. Support joists 113 are supported by bearers 114, which either lie under the joists 113 or are cross members of a grid containing both joists 113 and bearers 114. When fluid flows upwards (or backwardly) support joists 113 no longer support warp elements, whereby warp elements 111a deflect upwards more than warp elements 111b, and warp elements 111b deflect upwards more than warp elements 111c, and warp elements 111c deflect upwards more than warp elements 111d, thereby progressively increasing flow area through the filter screen or mesh 110.

It will be appreciated by persons skilled in the art that numerous variations end/or modifications may be made to the invention as shown in the specific embodiments without departing from the spirit or scope of the invention as broadly described. The present embodiments are, therefore, to be considered in all respects as illustrative and not restrictive, and features of any embodiment may be adapted, or extended into other embodiments.

What is claimed is:

1. A filtration barrier, comprising:
a filter mesh comprising:
a plurality of groups of flexible filter elements; each group comprising a first flexible filter element and a second flexible filter element disposed in spaced relation to the first flexible filter element;
first and second anchoring members spaced from each other, wherein each first and second flexible filter element of each of the plurality of groups is secured to both the first and second anchoring members and free therebetween;
wherein, within each group, the first flexible filter element is more flexible than the second flexible filter element;
a plurality of support members disposed downstream of the filter mesh for forward fluid flow through the filter mesh;
wherein the first and second flexible filter elements are disposed so as to rest against one or more of the support members during forward fluid flow through the filter mesh such that the first and second flexible filter elements are supported against downstream deflection and lie in a common plane, the common plane being transverse to a direction of forward fluid flow through the filter mesh;
wherein, for each group, the first and second flexible filter elements are configured such that, in response to reverse fluid flow, opposite the direction of forward fluid flow, the first flexible element of that group displaces farther from the common plane than the second flexible filter element of that group displaces from the common plane, such that a first backwash opening associated with the first flexible element is larger than a second backwash opening associated with the second flexible element.

2. The filtration barrier of claim 1:
wherein each group further comprises a third flexible filter element, the second flexible filter element being more flexible than the third flexible filter element;
wherein, for each group, the second and third flexible filter elements are configured such that, in response to reverse fluid flow, the second flexible element of that group displaces farther from the common plane than the third flexible filter element of that group displaces from the common plane, such that a third backwash opening associated with the third flexible element is smaller than the second backwash opening.

3. The filtration barrier of claim 2:
wherein each group further comprises a fourth flexible filter element, the third flexible filter element being more flexible than the fourth flexible filter element;
wherein, for each group, the third and fourth flexible filter elements are configured such that, in response to reverse fluid flow, the third flexible element of that group displaces farther from the common plane than the fourth flexible filter element of that group displaces from the common plane, such that a fourth backwash opening associated with the fourth flexible element is smaller than the third backwash opening.

4. The filtration barrier of claim 1, wherein the anchor members are disposed orthogonal to the first and second flexible filter elements.

5. The filtration barrier of claim 1, wherein the flexible filter elements are disposed in a regular pattern such that, in response to forward fluid flow through the filtration barrier, filter apertures between adjacent flexible filter elements are substantially the same size.

6. The filtration barrier of claim 1, wherein the first and second flexible filter elements have a round cross-section.

7. The filtration barrier of claim 1, wherein the first and second flexible elements are formed from identical materials, but have different cross-sectional profiles.

8. The filtration barrier of claim 1, wherein the first and second flexible elements have different material properties, but identical cross-sectional profiles.

9. The filtration barrier of claim 1, wherein the first and second flexible elements have both different material properties and different cross-sectional profiles.

10. The filtration barrier of claim 1, further comprising joists supporting the support members.

11. A method of filtering, comprising:
providing a filtration barrier, the filtration barrier comprising:
- a filter mesh comprising:
  - a plurality of groups of flexible filter elements; each group comprising a first flexible filter element and a second flexible filter element disposed in spaced relation to the first flexible filter element;
  - wherein, within each group, the first flexible filter element is more flexible than the second flexible filter element;
  - first and second anchoring members spaced from each other, wherein each first and second flexible filter element of each of the plurality of groups is secured to both the first and second anchoring members and free therebetween;
- a plurality of support members disposed downstream of the filter mesh for forward fluid flow through the filter mesh;

forwardly passing fluid through the filter mesh, wherein during the forward fluid flow:
- for each group, the first and second flexible filter elements rest against one or more of the support members such that the first and second flexible filter elements are supported against downstream deflection and lie in a common plane, the common plane being transverse to a direction of the forward fluid flow through the filter mesh;

thereafter, reversing fluid flow so that fluid flows through the filter mesh in a backwash direction, opposite to the direction of forward fluid flow; wherein, during the reverse fluid flow:
- for each group, the first flexible element of that group displaces farther from the common plane than the second flexible filter element of that group displaces from the common plane, such that a first backwash opening associated with the first flexible element is larger than a second backwash opening associated with the second flexible element.

12. The method of claim 11:
wherein each group further comprises a third flexible filter element that is less flexible than the second flexible filter element;
wherein during the forward fluid flow, for each group, the third flexible filter element rests against one or more of the support members such that the third flexible filter element is supported against downstream deflection and lies in the common plane;
wherein, during the reverse fluid flow, for each group, the second flexible element of that group displaces farther from the common plane than the third flexible filter element of that group displaces from the common plane, such that the second backwash opening associated with the second flexible element is larger than a third backwash opening associated with the third flexible element.

13. The method of claim 12:
wherein each group further comprises a fourth flexible filter element that is less flexible than the third flexible filter element;
wherein during the forward fluid flow, for each group, the fourth flexible filter element rests against one or more of the support members such that the fourth flexible filter element is supported against downstream deflection and lies in the common plane;
wherein, during the reverse fluid flow, for each group, the third flexible element of that group displaces farther from the common plane than the fourth flexible filter element of that group displaces from the common plane, such that the third backwash opening associated with the third flexible element is larger than a fourth backwash opening associated with the fourth flexible element.

14. The method of claim 11, wherein the anchor members are disposed orthogonal to the first and second flexible filter elements.

15. The method of claim 11, wherein the flexible filter elements are disposed in a regular pattern such that, during the forward fluid flow, filter apertures between adjacent flexible filter elements are substantially the same size.

16. The method of claim 11, wherein the first and second flexible filter elements have a round cross-section.

17. The method of claim 11, wherein the first and second flexible elements are formed from identical materials, but have different cross-sectional profiles.

* * * * *